US008258952B2

(12) United States Patent
Hyde et al.

(10) Patent No.: US 8,258,952 B2
(45) Date of Patent: Sep. 4, 2012

(54) SYSTEM FOR TREATING AT LEAST ONE PLANT INCLUDING A TREATMENT APPARATUS AND AN ELECTRONIC TAG INTERROGATOR

(75) Inventors: Roderick A Hyde, Redmond, WA (US); Muriel Y. Ishikawa, Livermore, CA (US); Jordin T. Kare, Seattle, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 730 days.

(21) Appl. No.: 12/317,928

(22) Filed: Dec. 29, 2008

(65) Prior Publication Data

US 2009/0229177 A1  Sep. 17, 2009

Related U.S. Application Data

(63) Continuation-in-part of application No. 12/077,066, filed on Mar. 14, 2008, and a continuation-in-part of application No. 12/215,674, filed on Jun. 27, 2008, and a continuation-in-part of application No. 12/283,299, filed on Sep. 9, 2008, and a continuation-in-part of application No. 12/290,011, filed on Oct. 23, 2008.

(51) Int. Cl.
*G08B 13/14* (2006.01)

(52) U.S. Cl. .................. 340/572.1; 340/10.1; 47/1.7

(58) Field of Classification Search .................. None
See application file for complete search history.

(56) References Cited

U.S. PATENT DOCUMENTS

| 4,379,372 | A | 4/1983 | Alexander et al. |
| 4,570,368 | A | 2/1986 | Stover |
| 4,972,616 | A | 11/1990 | Doll |
| 5,339,517 | A | 8/1994 | Diemer |
| 6,597,465 | B1 | 7/2003 | Jarchow et al. |
| 6,671,698 | B2 | 12/2003 | Pickett et al. |
| 6,701,665 | B1 | 3/2004 | Ton et al. |
| 6,745,127 | B2 * | 6/2004 | Crosby ............... 702/2 |
| 6,888,458 | B2 * | 5/2005 | Carlson ............. 340/540 |
| 6,963,881 | B2 | 11/2005 | Pickett et al. |
| 7,076,900 | B2 | 7/2006 | Faulkner |
| 7,080,577 | B2 | 7/2006 | Latschbacher et al. |
| 7,143,066 | B2 | 11/2006 | Shear et al. |
| 7,200,804 | B1 | 4/2007 | Khavari et al. |

(Continued)

FOREIGN PATENT DOCUMENTS

JP  2006101739 A  4/2006

(Continued)

OTHER PUBLICATIONS

Data Identifier and Application Identifier Standard, American National Standard, Material Handling Industry (Oct. 9, 2006), pp. 1-110.

(Continued)

*Primary Examiner* — Eric M Blount
(74) *Attorney, Agent, or Firm* — Workman Nydegger

(57) ABSTRACT

A system for tracking treatments for at least one plant includes an electronic tag associated with the at least one plant, an electronic tag interrogator configured to interrogate the electronic tag, and a treatment apparatus for applying treatments to the at least one plant.

64 Claims, 11 Drawing Sheets

U.S. PATENT DOCUMENTS

| | | |
|---|---|---|
| 7,233,250 B2 | 6/2007 | Forster |
| 7,316,202 B2 | 1/2008 | Fantin et al. |
| 7,403,855 B2* | 7/2008 | Fuessley et al. ............... 702/5 |
| 7,702,462 B2* | 4/2010 | Fuessley et al. ............... 702/2 |
| 7,761,334 B2 | 7/2010 | Pickett et al. |
| 7,798,746 B2 | 9/2010 | Byles |
| 2001/0029996 A1* | 10/2001 | Robinson ............... 141/11 |
| 2002/0170229 A1 | 11/2002 | Ton et al. |
| 2003/0066234 A1 | 4/2003 | Bussey, Jr. |
| 2003/0218060 A1* | 11/2003 | Carlson ............... 235/376 |
| 2004/0088330 A1 | 5/2004 | Pickett et al. |
| 2004/0088916 A1 | 5/2004 | Ton et al. |
| 2005/0134461 A1 | 6/2005 | Gelbman et al. |
| 2006/0022824 A1 | 2/2006 | Olsen, III et al. |
| 2006/0080819 A1 | 4/2006 | McAllister |
| 2006/0085266 A1 | 4/2006 | Wei et al. |
| 2006/0116791 A1 | 6/2006 | Ravula et al. |
| 2006/0220955 A1 | 10/2006 | Hamilton |
| 2007/0044445 A1 | 3/2007 | Spicer et al. |
| 2007/0079536 A1 | 4/2007 | Hall |
| 2007/0152045 A1 | 7/2007 | Erickson et al. |
| 2007/0185749 A1 | 8/2007 | Anderson et al. |
| 2007/0222596 A1 | 9/2007 | Kleijn et al. |
| 2007/0285229 A1 | 12/2007 | Batra et al. |
| 2008/0074254 A1 | 3/2008 | Townsend et al. |
| 2008/0129497 A1 | 6/2008 | Woodard et al. |
| 2008/0220721 A1 | 9/2008 | Downie et al. |
| 2008/0243392 A1* | 10/2008 | Fuessley et al. ............... 702/2 |
| 2008/0297350 A1 | 12/2008 | Iwasa et al. |
| 2009/0042180 A1* | 2/2009 | Lafferty et al. ............... 435/4 |
| 2009/0070037 A1 | 3/2009 | Templeton et al. |
| 2009/0108997 A1 | 4/2009 | Petterson et al. |
| 2009/0128336 A1 | 5/2009 | Huang et al. |
| 2009/0319400 A1 | 12/2009 | Pratt |
| 2010/0283584 A1 | 11/2010 | Mcallister |

FOREIGN PATENT DOCUMENTS

| | | | |
|---|---|---|---|
| WO | WO 2004/023377 A1 | 3/2004 | |
| WO | WO 2007/042327 A1 | 4/2007 | |

OTHER PUBLICATIONS

Hyde et al.; U.S. Appl. No. 12/077,066, filed Mar. 14, 2008.
Hyde et al.; U.S. Appl. No. 12/215,674, filed Jun. 27, 2008.
Hyde et al; U.S. Appl. No. 12/283,299, filed Sep. 9, 2008.
Hyde et al; U.S. Appl. No. 12/290,011, filed Oct. 23, 2008.

* cited by examiner

SYSTEM FOR TREATING AT LEAST ONE PLANT INCLUDING A TREATMENT APPARATUS AND AN ELECTRONIC TAG INTERROGATOR

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).
Related Applications:

For purposes of the USPTO extra-statutory requirements, the present application constitutes a continuation-in-part of U.S. patent application Ser. No. 12/077,066, entitled METHOD AND APPARATUS FOR TRACKING PLANTS WITH AN ELECTRONIC TAG, naming Roderick A. Hyde, Muriel Y. Ishikawa, Jordin T. Kare, and Lowell L. Wood, Jr. as inventors, filed Mar. 14, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/215,674, entitled METHOD AND SYSTEM FOR CORRELATING EXTERNAL DATA TO A PLANT WITH AN ELECTRONIC TAG, naming Roderick A. Hyde, Muriel Y. Ishikawa, Jordin T. Kare, and Lowell L. Wood, Jr. as inventors, filed Jun. 27, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/283,299, entitled ELECTRONIC TAG AND METHOD FOR USING AN ELECTRONIC TAG CONFIGURED TO TRACK AT LEAST ONE PLANT, naming Roderick A. Hyde, Muriel Y. Ishikawa, Jordin T. Kare, and Lowell L. Wood, Jr. as inventors, filed Sep. 9, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/290,011, entitled ELECTRONIC TAG CONFIGURED TO SENSE A PLANT ENVIRONMENT, naming Roderick A. Hyde, Muriel Y. Ishikawa, Jordin T. Kare, and Lowell L. Wood, Jr. as inventors, filed Oct. 23, 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s). All subject matter of the Related Applications and of any and all parent, grandparent, great-grandparent, etc. applications of the Related Applications is incorporated herein by reference to the extent such subject matter is not inconsistent herewith.

SUMMARY

According to an embodiment, a method for tracking treatments for at least one plant includes interrogating an electronic tag associated with at least one plant and applying a treatment to the at least one plant. The treatment application may be responsive to data received from the electronic tag. The interrogation of the electronic tag may include writing data corresponding to a treatment responsive to applying the treatment. A user interface may provide an indication of a need for treatment responsive to data received corresponding to the electronic tag interrogation.

According to an embodiment, a system for applying a treatment to at least one plant includes a treatment apparatus configured for applying a treatment to at least one plant and at least a portion of an electronic tag interrogator operatively coupled to the treatment apparatus. The treatment apparatus may be configured to provide a treatment application signal to the electronic tag interrogator upon actuation of the treatment application. The electronic tag interrogator may be configured to provide an actuation signal to the treatment apparatus to enable application of the treatment.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
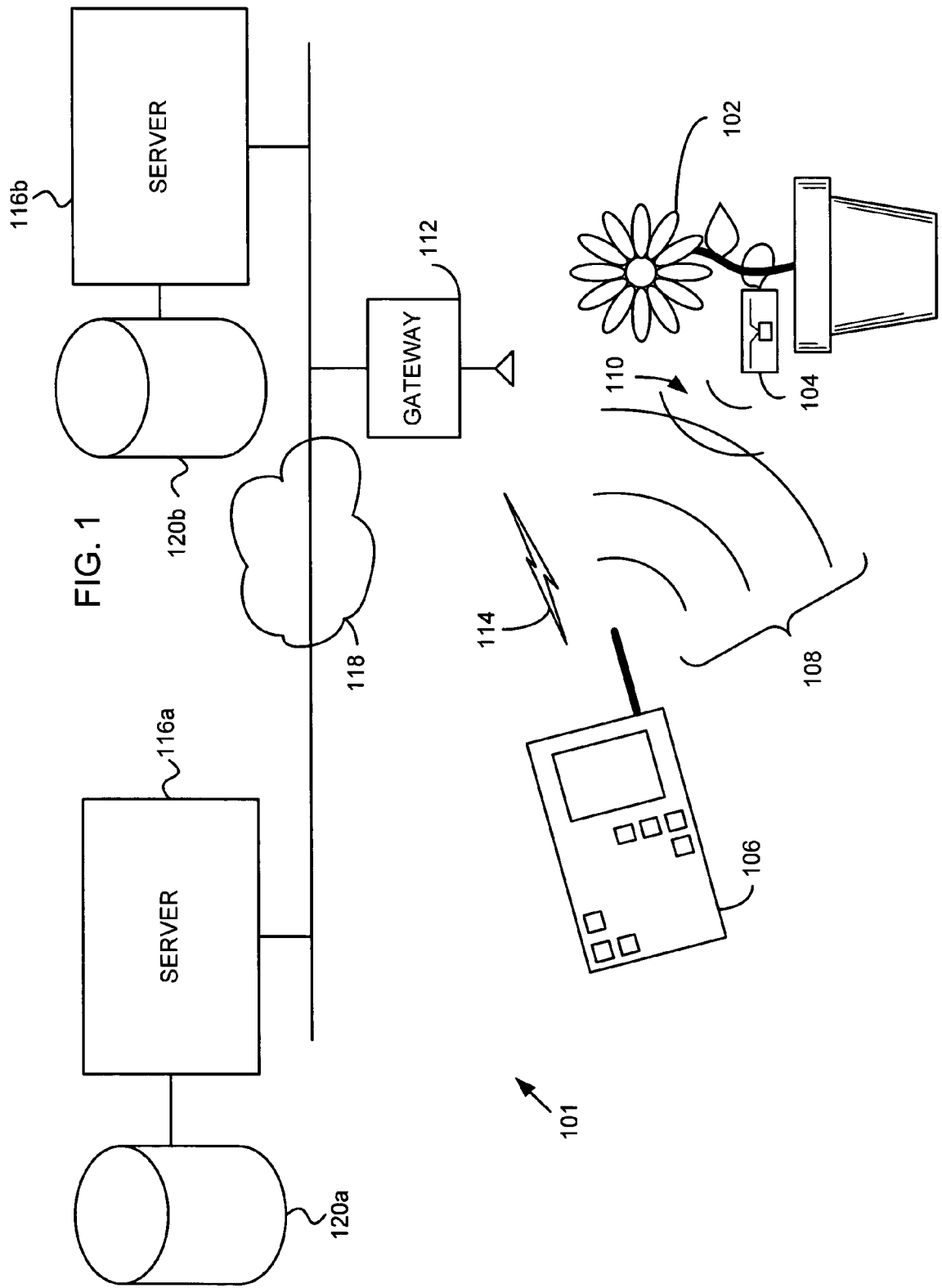
FIG. 1 is an illustrative diagram of a system configured to interface to one or more populations of electronic tags and for performing methods described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is an illustrative diagram of a system 101 for interfacing to one or more electronic tags 104 coupled to one or more plants 102 according to an embodiment. An electronic tag interrogator 106 may interrogate the electronic tag 104 to receive identification data corresponding to the at least one plant 102. For example, the electronic tag interrogator 106 may include a radio frequency identification (RFID) interrogator that is configured to emit an interrogation field 108 including a radio frequency signal to illuminate one or more radio frequency tags (RF tags) 104. The interrogation field or interrogation signal 108 may be modulated with an appropriate pattern for evoking a response 110 from the RF tag 104. According to some embodiments, the electronic tag interrogator may be in the form of a hand-held and/or portable apparatus that may optionally be in communication with a remote device 112 via a communication signal 114. For example, the remote device 112 may include a gateway, host computer, etc. configured to communicate with the electronic tag interrogator 106 via a radio communication signal 114.

According to an embodiment, the remote device 112 may be operatively coupled to a second remote device 116a, such as a server, over a network 118. The second remote device 116a may include a storage apparatus 120a configured to store at least a portion of a database including information corresponding to the identification data from the electronic tag 104 and the associated at least one plant 102. The remote device 112 may be operatively coupled to a third remote device 116b such as a server, over the network 118. The third remote device 116b may also include a storage apparatus 120b configured to store at least a portion of a database including information corresponding to the identification data from the electronic tag 104 and the associated at least one plant 102.

Embodiments of electronic tags may include user-writable memory. The memory contents may be determined by the user. The user may structure data in the memory according to open or closed standards. According to some embodiments, the memory of the electronic tag may include data structured for access by a plurality of trading partners. As will be described additionally below, electronic tags may be configured to remain with at least one plant 102 while the at least one plant 102 proceeds to market.

The electronic tag 104 may, for example, include various types of electronic tags including a radio frequency tag, such as a passive radio frequency tag, an active radio frequency tag, a backscatter radio frequency tag, a half-duplex radio frequency tag, or a full-duplex radio frequency tag, for example; a touch memory device; a proximity card; a smart card; a photonic tag; etc. Accordingly, the interrogation signal 108 and response signal 110 may include corresponding forms such as radio frequency interrogation and response, touch memory interrogation and response, proximity card interrogation and response, smart card interrogation and response, etc.

Additionally, electronic tags may include read-only, read/write, and write-once-read-many-times (WORM) capabilities. In the case of a writable tag technology such as a read/write or WORM, the relationship shown diagrammatically in FIG. 1 may include writing data from the interrogator 106 to the electronic tag 104 via the interrogation signal 108 and response 110. According to an embodiment, the interrogator 106 may write to the electronic tag 104 identification data and/or one or more external data coordinates and/or other data associated with accessing external data related to the at least one plant 102.

While the at least one plant 102 is illustrated as a single plant in a pot, other forms are contemplated such as flats, rows, pallets, bare root, root ball, groupings, arrangements, beddings, portable gardens, etc.

The at least one plant may include at least one seed, cutting, rhizome, bulb, corm, tuber, annual, biennial, cut flower, perennial, grass, creeper, climber, vine, fern, shrub, bush, or tree.

Figure 2:
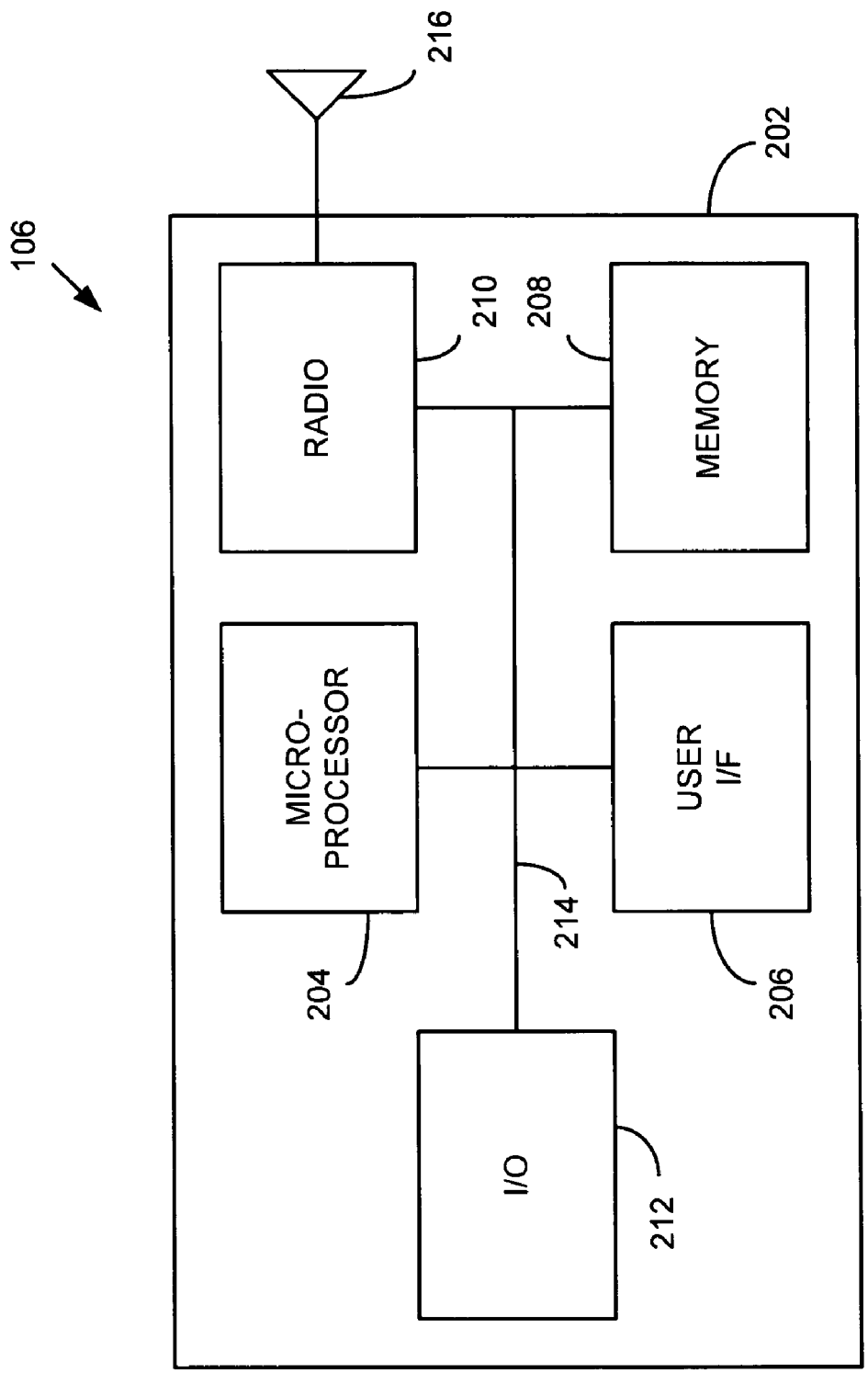
FIG. 2 is a block diagram of an illustrative electronic tag interrogator as depicted in FIG. 1, according to an embodiment.

FIG. 2 is a block diagram of an illustrative electronic tag interrogator 106 as depicted in FIG. 1, according to an embodiment. The electronic tag interrogator 106 may be embodied, for example, as an RF tag interrogator. The interrogator 106 may include a housing 202 substantially enclosing a microprocessor 204, user interface 206, memory circuitry 208, a radio configured to interrogate one or more types of RF tags, and an interface 212 operatively connected by one or more data buses 214. The radio 210 may include one or more antennas 216 operable to illuminate one or more RF tags with an interrogation field and receive a response signal from the one or more RF tags. The interface 212 may itself include a radio configured for communication with a host computer or computer network.

The interrogator 106 may be operable to run a computer program such as a data parsing program configured to parse data pertaining to one or more plants from one or more RF tags, and determine one or more external data coordinates corresponding to a database holding information corresponding to the data. Additionally or alternatively, the interrogator 106 may be operable to transmit received data over the interface 212 to a remote processing resource 112, 116a, 116b and receive information corresponding to the at least one plant (not shown) from the remote processing resource.

According to an illustrative embodiment, the RF tag interrogator 106 may receive a command such as a trigger pull through the user interface 206, interrogate an RF tag associated with at least one plant (not shown) with the radio 210 and at least one antenna 216 to receive data corresponding to the at least one plant, temporarily write received data to workspace in the memory circuitry 208, and execute a program from memory circuitry 208 with the microprocessor 204 to determine a location of an external resource for performing a query of or writing data to an external database.

Referring back to FIG. 1, one or more external resources or servers 120a, 120b may provide logical linkages between electronic tags 104, databases for storing data corresponding to the at least one population of at least one plants, tag population query nodes or other functions. The two or more external resources 120a, 120b may each include a portion of information related to the at least one plant. Alternatively, the two or more external resources 120a, 120b may represent a plurality of potential resources for storing or retrieving data related to the at least one plant, supporting networked query functions, and provide other resources related to reading, writing, and tracking.

Each external resource 120a, 120b that includes data disposed therein related to at least one plant includes the data also disposed on the database for identifying a portion of the database corresponding to the at least one plant.

The electronic tag interrogator 106 may include a computer program configured to store additional data corresponding to a record of additional treatments provided to the at least one plant upon such treatment application. The electronic tag interrogator 106 may include a computer program configured to retrieve from the database at least a portion of the data corresponding to the care of the at least one plant and determine whether a treatment is scheduled to be provided to the at least one plant. The electronic tag interrogator 106 may provide an indication to administer the treatment to the at least one plant if the treatment is scheduled. Upon receiving acknowledgement of the treatment being provided, the electronic tag interrogator 106 may then store in the database data corresponding to a record of providing the treatment.

The electronic tag interrogator 106 may further store location data in an industry accessible registry, the location data corresponding to an address for accessing the database. For example, server 120a may be a resource that provides the database for storing treatment information for plants, and server 120b may be a resource that provides a database for storing one or more locations of server(s) 120a, where multiple instances of servers 120a are accessible for query and/or writing.

Referring to FIG. 1, a software program running on server 120a may associate in a database 116a data corresponding to the care of at least one plant 102 with data identifying the at least one plant 102. The data identifying the at least one plant 102 may be retained in an electronic identification tag 104 associated with each at least one plant 102. The data corresponding to the care of the at least one plant 102 may include plant care instructions or a record of at least one plant care treatment provided to the at least one plant 102.

For embodiments where the electronic tag 104 is writable, the electronic tag interrogator 106 may write to the electronic identification tag 104 a location corresponding to the database 116a where related data is disposed. Additionally or alternatively, the external resource 120a, the electronic tag interrogator 106, or another computing resource may transmit to a second resource 120b at least a portion of the data identifying the at least one plant and data corresponding to the location of the first database 116b for storage on the second database 116b. The data corresponding to the location of the first database 116a may be an accessible address such as an IP address or a URL from which the data corresponding to the care of the at least one plant may be retrieved.

Other embodiments may include additional or reduced functionality in the interrogator 106, may rely on increased or reduced functionality in an external resource, may be operated by a user or operate automatically, may be interfaced to a treatment device to detect treatments, and/or may rely on alternative interrogation technologies. The interface 212 may include a wired interface and/or an intermittent interface such as a memory stick, USB drive, or other detachable memory.

Figure 3:
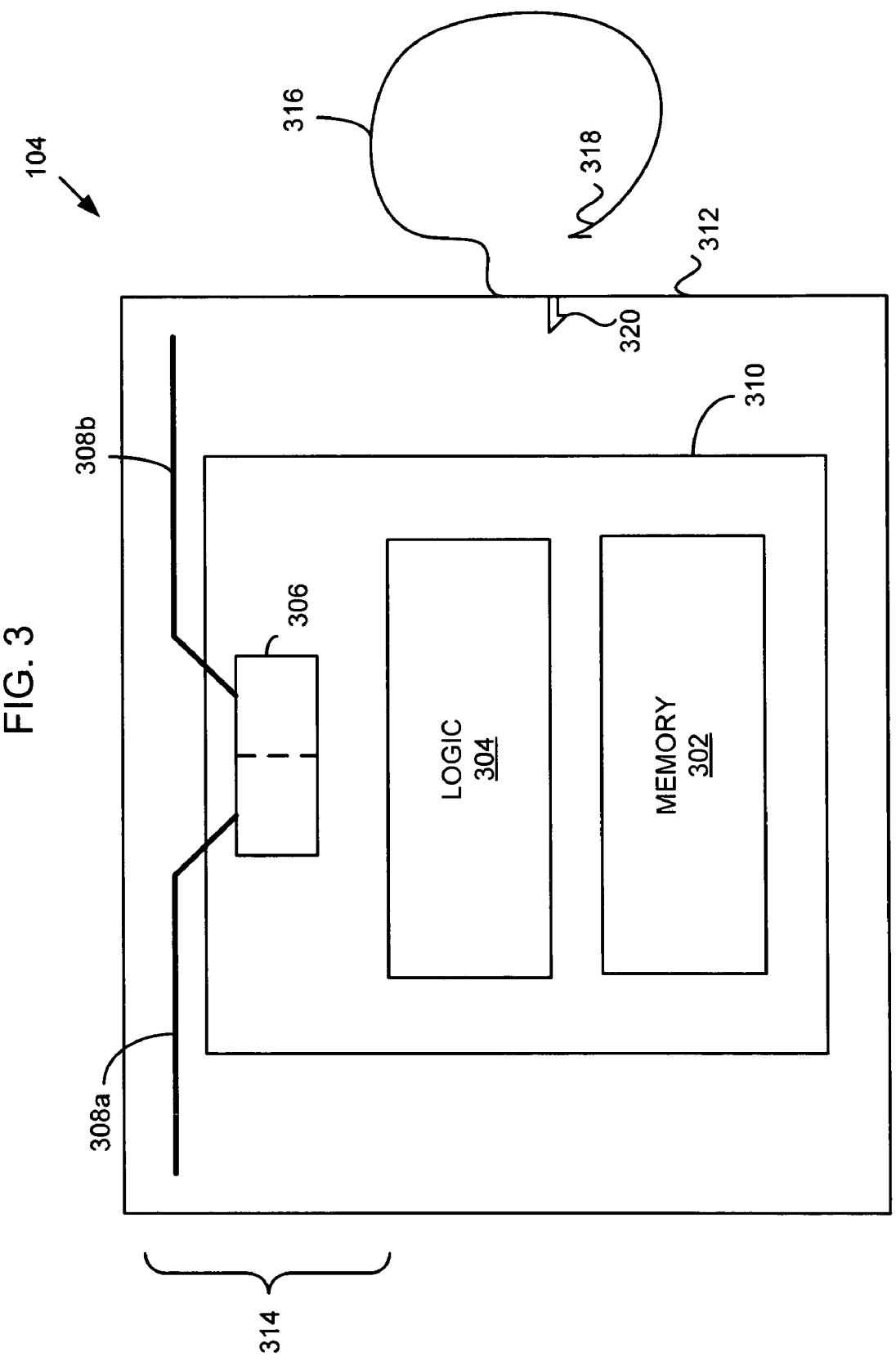
FIG. 3 is a block diagram of an illustrative electronic tag as depicted in FIG. 1, according to an embodiment.

FIG. 3 is a block diagram of an illustrative electronic tag 104 as depicted in FIG. 1, according to an embodiment wherein the electronic tag is in the form of a radio frequency (RF) tag. The RF tag 104 includes a memory circuit 302 (which may be read/write, WORM, or read-only, for example) and a logic circuit 304 operatively coupled to the memory circuit 302. A radio frequency transceiver 306 is operatively coupled to the logic circuit 304. The radio frequency transceiver may be further coupled to an antenna 308a, 308b which may include two respective antenna segments 308a and 308b. The radio frequency transceiver 306 may be configured to provide a switched connection between the antenna segments 308a and 308b. According to an embodiment, the memory circuit 302, logic circuit 304, and transceiver 306 may be formed on a die 310 as an integrated circuit. The integrated circuit 310 and the antenna 308a, 308b may be disposed in a package 312 that may include a printed circuit, for example.

The antenna 308a, 308b, transceiver 306, and optionally at least a portion of the logic circuit 304 may provide an interrogation interface 314 configured to communicate with an external interrogator (not shown). According to an embodiment, the transceiver 306 may hold the antenna portions 308a and 308b in substantial continuity during a first portion of a communication session. During the first portion of the communication session, an interrogation signal (not shown) in the form of radio frequency illumination may be received by the antenna 308a, 308b. In the case of a passive electronic tag 104, the radio frequency illumination may provide an AC voltage that is rectified by a portion of the transceiver 306 and used to charge one or more capacitors (not shown) that in turn provide DC power rails to operate the transceiver 306, logic 304, and memory 302. When the interrogation signal is received, the capacitor(s) charge and the transceiver 306, logic 304, and optionally the memory 302 may be powered up. According to some embodiments, it may be advantageous to power up only portions of the electronic tag 104 as the portions are needed.

Various messages may be encoded on the interrogation field. For example, one message may request tag ID, such as a segment of data by which the unique identity of the electronic tag 104 may be identified. Another message may specify a tag ID and request a portion or more of data held in the memory 302 of the particular electronic tag associated with the tag ID. According to one embodiment, the electronic tag 104 may respond to a data request in half-duplex as a backscatter signal.

For example, the electronic tag 104 may receive a request for at least a portion of data from the memory 302 over a modulated interrogation field (not shown) during a first portion of the communication session. The interrogator (not shown) may then cease to modulate the interrogation signal but maintain illumination of the signal onto the antenna 308a, 308b. The logic circuit 304 (powered by the illumination provided by the interrogation signal) then fetches the requested portion of data from the memory 302 and outputs the data to the transceiver 306. The transceiver 306 selectively couples and uncouples the portions of the antenna 308a, 308b in a pattern corresponding to the data received from the logic 304. The selective coupling and uncoupling of the antenna portions 308a, 308b creates a corresponding variation in reflectivity to the radio frequency illumination provided by the antenna. The variation in reflection may then be detected by the interrogator (not shown) and converted into data corresponding to the data fetched from memory 302.

Of course, substantial handshaking, error correction, and other interactions between the interrogation signal (not shown) and the response signal (not shown). may be used to improve communication reliability, extend range, and/or provide other capabilities.

Similarly, data may be written from an interrogator (not shown) to the memory 302 of an electronic tag 104 using a similar approach. Data that may be written to and/or read from the memory 302 an electronic tag 104 may include a range of contents. For example, the data may include an identifier corresponding to the at least one plant and/or one or more data coordinates referencing external data locations corresponding to the at least one plant.

According to an embodiment, the package 312 may include encapsulation or other form of protection for the circuitry and/or antenna. The package 312 may include a coupling 316 configured to couple to at least one plant to attachment to a plant (not shown). In the example of FIGS. 1 and 3, the coupling 316 may include a loop such as a "zip tie" or lanyard that provides a permanent or semi-permanent association with a plant or a group of plants. According to an embodiment, the coupling 316 may be formed integrally with the package 312 for convenient attachment to one or more plants.

The coupling 316 may be embodied as a lanyard 316 having a coupling tip 318. The coupling tip 318 may be configured to insert into and be retained by a corresponding coupling socket 320 formed in the electronic tag package 312 to effectively form an attachment to the at least one plant 102.

Figure 4:
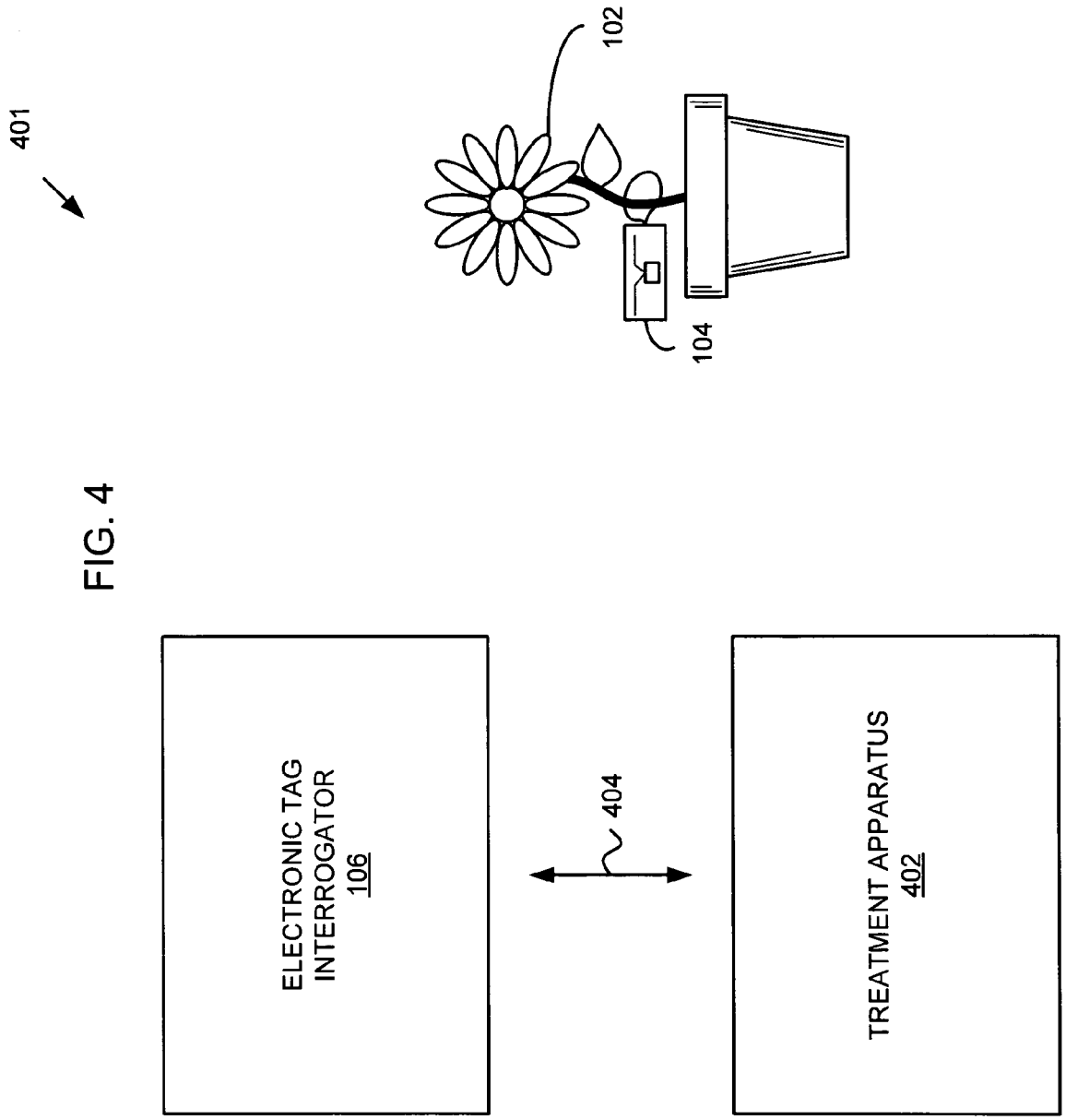
FIG. 4 is a diagram of a system including an electronic tag interrogator and an operatively coupled treatment apparatus, according to an embodiment.

FIG. 4 is a diagram of a system 401 including an electronic tag interrogator 106 and an operatively coupled treatment apparatus 402, according to an embodiment. The operative coupling 404 between the electronic tag interrogator 106 and the treatment apparatus 402 may include a physical coupling. According to an embodiment, the operative coupling 404 may include a logical coupling. The electronic tag interrogator 106 and treatment apparatus 402 may cooperate to measure and/or apply treatments to at least one plant 102 provided with a corresponding electronic tag 104. Of course, according to an embodiment the at least one plant 102 may include a plurality of plants, substantially each group of at least one plants 102 being operatively coupled to a corresponding electronic tag 104. Accordingly, the number of plants 102 and electronic tags 104 may be the same or different in a given embodiment.

Generally, the electronic tag interrogator 106 and the treatment apparatus 402 are configured to cooperatively operate to administer care to the at least one plant 102 using the electronic tag 104, according to various embodiments.

As described above, the electronic tag interrogator 106 may be configured to interrogate one or more electronic tags 104. Interrogation may include one or more transactions, illustrative transactions being described below. In some embodiments, all or portions of transactions may be described separately from an interrogation step. According to some embodiments, the separately described portions of transactions may be performed using methods that may not involve interrogation of an electronic tag.

According to embodiments, the electronic tag interrogator 106 may include a radio frequency interrogator; a touch memory interrogator, a proximity card interrogator, a photonic tag interrogator, or a smart card interrogator.

The treatment apparatus 402 may be embodied in a variety of ways. For example, the treatment apparatus 402 may include one or more mechanisms configured to physically modify the at least one plant 102, physically modify the environment of the at least one plant, measure a parameter corresponding to the at least one plant, and/or measure a parameter corresponding to the environment of the at least one plant. For example, the treatment apparatus 402 may include a water source, a watering wand, a fertilizer source, a bulb planter, a lawn mower, a pruner, a trimmer, an aerator, a cultivator, a shovel, a spade, a harvester, a moisture meter, a pH tester, an alkalinity tester, a thermometer, or a light meter.

According to an embodiment, the operative coupling 404 includes a signal path from the electronic tag interrogator 106 to the treatment apparatus 402. The operative coupling 404, according to an embodiment, includes a signal path from the treatment apparatus 402 to the electronic tag interrogator. According to an embodiment, the operative coupling 404 may include one or more bidirectional signal paths. The operative coupling 404 may be configured to transmit an actuation signal from the electronic tag interrogator 106 to the treatment apparatus 402. The operative coupling 404 may be configured to transmit a treatment application signal from the treatment apparatus 402 to the electronic tag interrogator 106.

The operative coupling 404 may thus couple application of a treatment to the at least one plant 102 by the treatment apparatus 402 to interrogation of the electronic tag 104 by the electronic tag interrogator 106.

Figure 5:
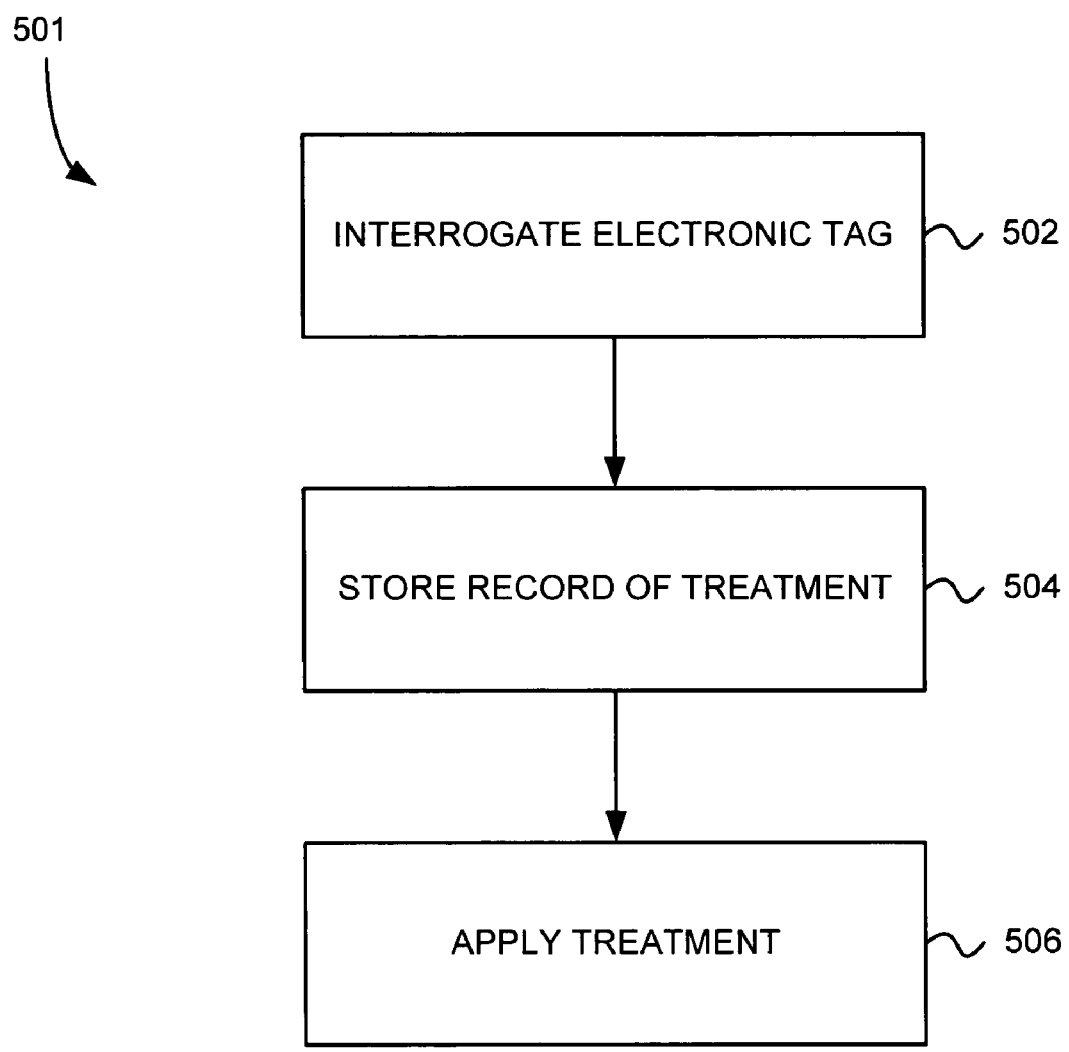
FIG. 5 is a flow chart illustrating a method for using an electronic tag for tracking treatments applied to at least one plant, according to an embodiment.

FIG. 5 is a flow chart illustrating a method 501 for using an electronic tag for tracking treatments applied to at least one plant, according to an embodiment. In step 502, an electronic tag interrogator interrogates an electronic tag associated with at least one plant. For example, the electronic tag interrogator may receive identification data from the electronic tag. According to an embodiment, the electronic tag interrogator may receive a record of past treatments from the electronic tag.

Proceeding to step 504, a record of a treatment is stored. For example, storing the record of a treatment 504 may include writing data to a writable memory circuit in the electronic tag. According to an embodiment, storing a record of the treatment may include writing data to an external database location corresponding to the identity code.

Proceeding to step 506, the treatment is performed. For example, the treatment may include physically modifying the at least one plant, physically modifying the environment of the at least one plant, measuring a parameter corresponding to the at least one plant, and/or measuring a parameter corresponding to the environment of the at least one plant. For example, applying the treatment may include one or more of physically modifying the at least one plant, such as pruning the at least one plant, trimming the at least one plant, mowing the at least one plant, and/or harvesting the at least one plant; modifying the environment of the at least one plant, such as watering the at least one plant, fertilizing the at least one plant, modifying the soil pH in the environment of the at least one plant, cultivating the soil in the environment of the at least one plant, aerating the soil in the environment of the at least one plant, heating the soil near the at least one plant, heating the air in the vicinity of the at least one plant, or illuminating the at least one plant; planting the at least one plant; transplanting the at least one plant; measuring the environment of the at least one plant, such as measuring moisture in the vicinity of the at least one plant, measuring pH in the environment of the at least one plant, measuring alkalinity in the environment of the at least one plant, measuring the temperature in the environment of the at least one plant, or measuring illumination in the vicinity of the at least one plant; or measuring a parameter corresponding to the at least one plant, such as measuring the turgor pressure of the at least one plant, measuring a light spectrum scattered from the at least one plant, measuring a weight corresponding to the at least one plant, measuring one or more alkaloids from the at least one plant, measuring a physical conformation of the at least one plant, or measuring a size of the at least one plant.

According to an embodiment, step 506 may include providing notification or indication to a user that a treatment is needed. According to an embodiment, step 506 may include controlling the treatment apparatus.

The steps 502, 504, and 506 may optionally be combined, split, repeated, and/or performed in a different order. For example, a treatment may be applied to a population of plants and a record of the treatment written to electronic tags associated with the plants substantially while the treatment is provided or after the treatment is provided. According to another example, a transaction may include interrogating an electronic tag to determine a need for a treatment, and then applying the treatment; which may then be followed by writing a record of the treatment to the electronic tag or an external database.

Figure 6:
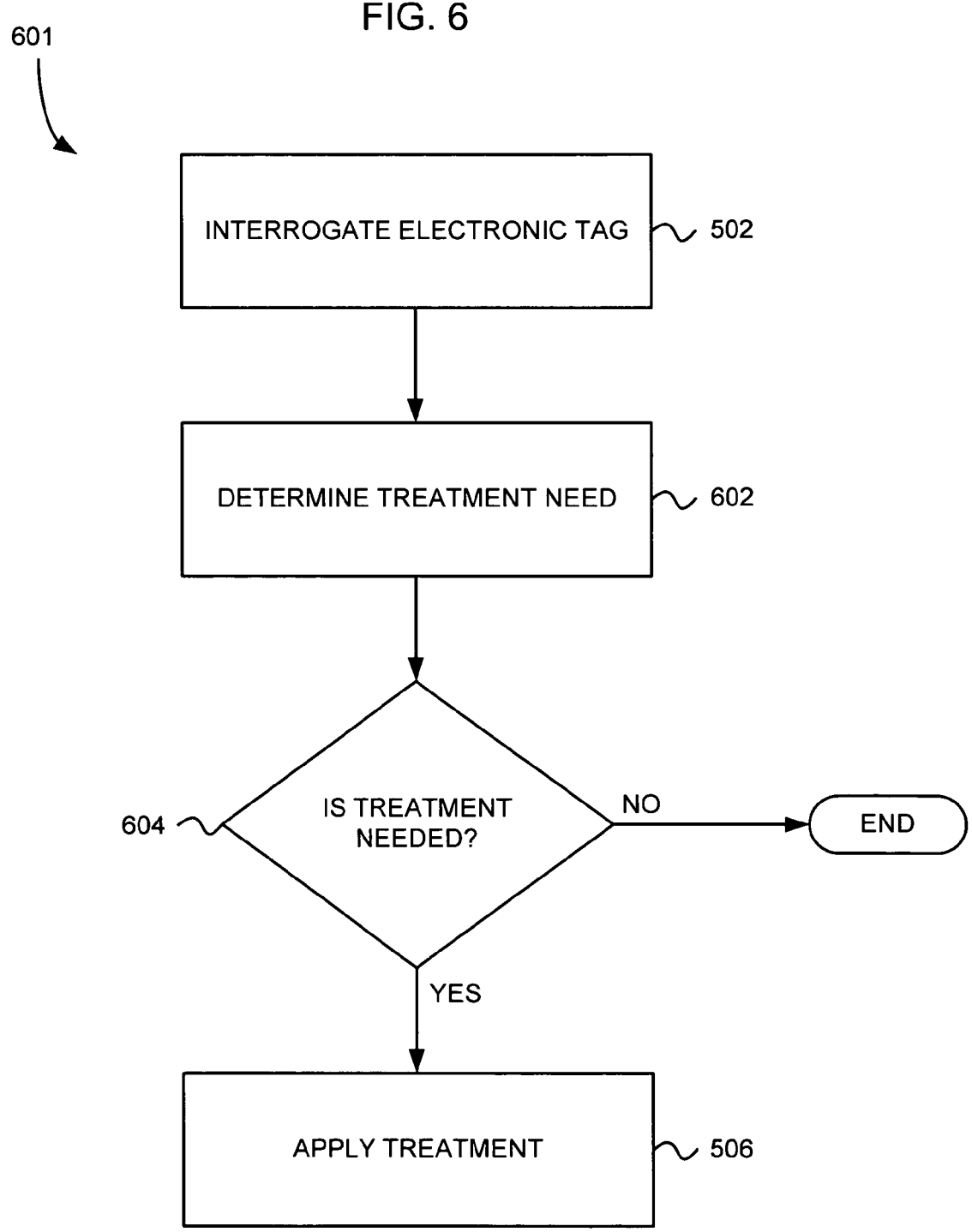
FIG. 6 is a flow chart illustrating a method for using an electronic tag for conditional determination of a treatment for application to at least one plant, according to an embodiment.

Transactions may further include conditional operations. FIG. 6 is a flow chart illustrating a method 601 for using an electronic tag for conditional determination of a treatment for application to at least one plant, according to an embodiment. Step 502 may be similar to embodiments described above. In step 602 a treatment need is determined. Proceeding to step 604, if the treatment is needed, the method proceeds to step 506 where the treatment is applied. If it is determined in step 604 that the treatment is not needed, the process may exit, may step to a next treatment determination, or may be repeated for a next electronic tag and corresponding at least one plant, for example.

Determination of a treatment need may be executed locally, such as by a microprocessor executing computer instructions in an electronic tag interrogator, by an external computing resource, according to a pre-determined schedule, etc.

For example, interrogating the electronic tag 502 and/or determining a treatment need 602 may include reading a record of past treatments applied to the at least one plant. The record of past treatments may be read from a memory circuit in the electronic tag. Alternatively, interrogating the electronic tag 502 may include reading an identity code from the electronic tag and the record of past treatments may be read from an external database location corresponding to the identity code. Determination of whether a treatment is needed may include comparing a treatment interval to the elapsed time since the last similar treatment. When the elapsed time is about equal to or greater than the treatment interval, the treatment is applied in step 506.

Alternatively, interrogating an electronic tag 502 may include reading a value from the electronic tag, such as a data value corresponding to a sensed parameter. Determination of a treatment need 602 may include comparing the data value to a range of optimal values. For example, the electronic tag 502 may be equipped with a soil moisture sensor and the data value may correspond to the amount of soil moisture. The treatment need determination 602 may include determining whether the moisture data value indicates additional watering, and applying the treatment 506 may include watering the at least one plant if additional watering is indicated.

Applying the treatment 506 may include automatically controlling a treatment apparatus responsive to the value corresponding to the environment.

Figure 7:
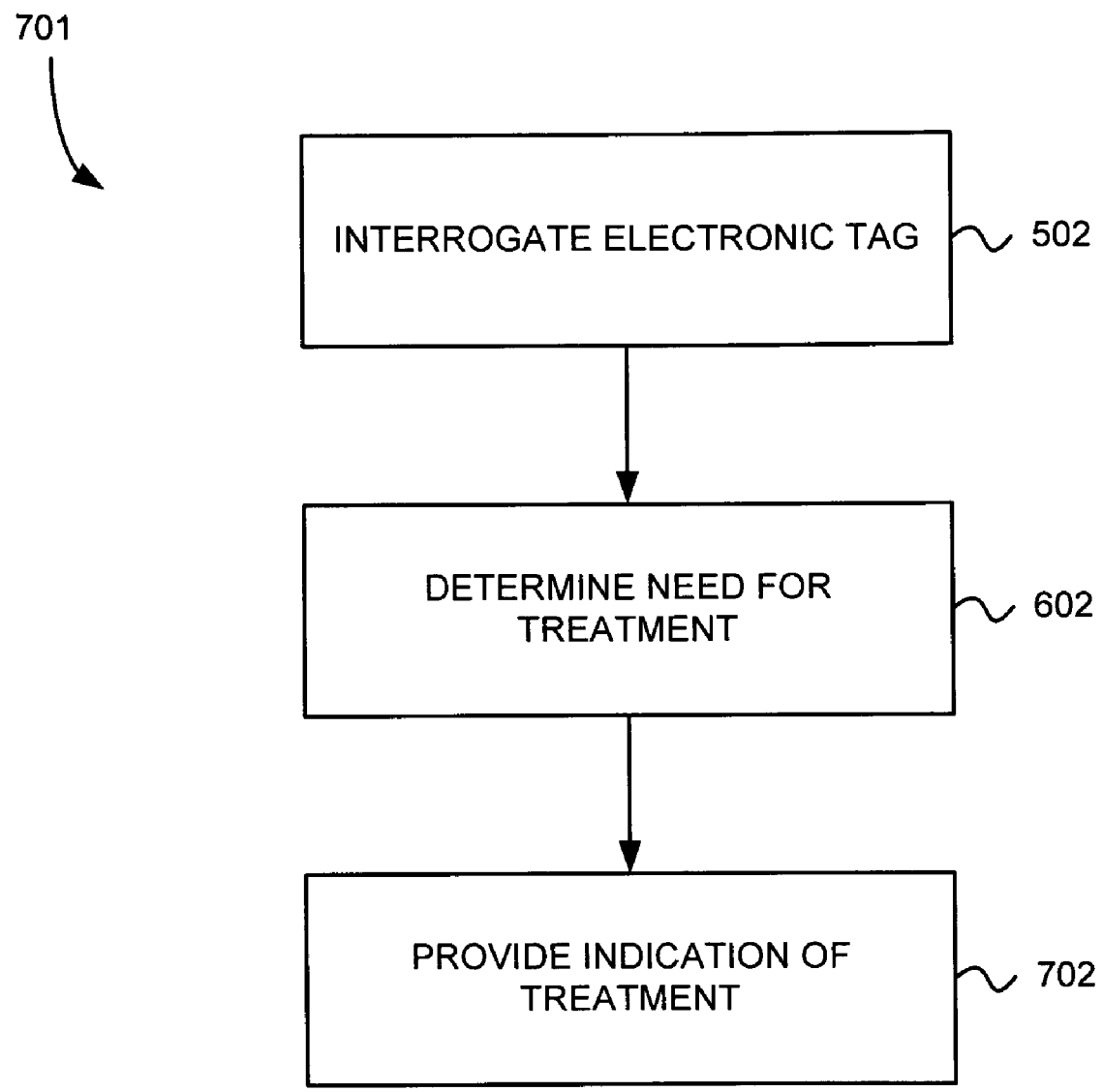
FIG. 7 is a flow chart illustrating another method of using an electronic tag for determining a treatment for application to at least one plant, according to an embodiment.

Alternatively, applying the treatment may include providing an indication of treatment need to a system and/or a caregiver. FIG. 7 is a flow chart illustrating a method 701 of using an electronic tag for determining a treatment for application to at least one plant, according to an embodiment. Step 702 includes providing an indication of a need for treatment to a system and/or to a person, such as to a person responsible for providing treatment. For example, a person responsible for providing treatment may include a gardener, farmer, nurseryperson, harvester, planter, propagator, maintenance worker, or administrator.

Figure 8:
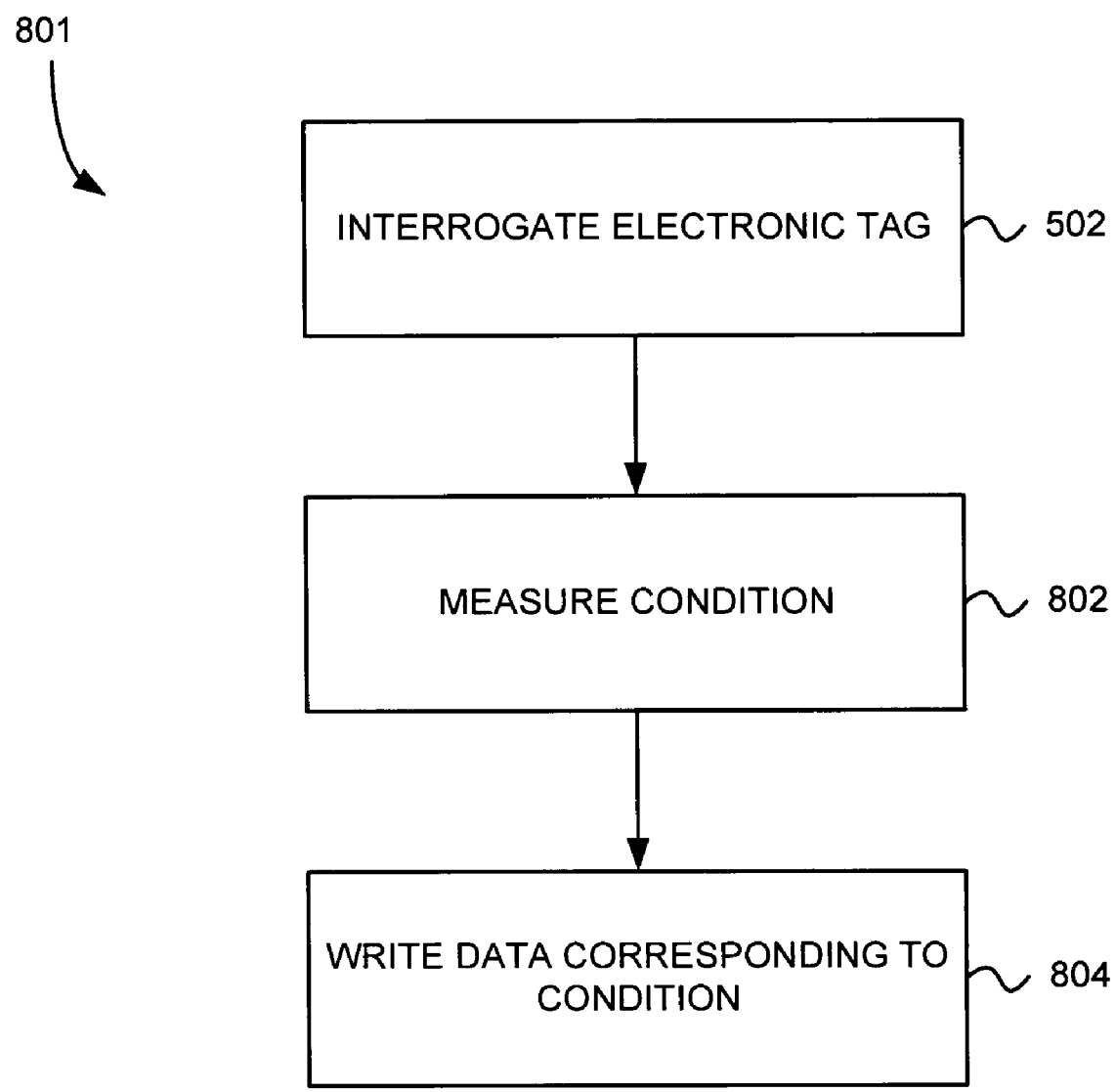
FIG. 8 is a flow chart illustrating a method for using an electronic tag for tracking treatments applied to at least one plant, wherein the treatment includes measuring a condition corresponding to the at least one plant, according to an embodiment.

As indicated above, the treatment apparatus may include a measurement apparatus configured to measure a parameter corresponding to at least one plant and/or the environment of at least one plant. FIG. 8 is a flow chart illustrating a method 801 for using an electronic tag for tracking treatments applied to at least one plant, wherein the treatment includes measuring a condition corresponding to the at least one plant, according to an embodiment. In step 502, an electronic tag corresponding to at least one plant is interrogated, as described above.

Proceeding to step 802, a condition is measured. Step 802 may correspond to step 506, described above, where a treatment includes measuring a condition using at least one treatment apparatus. For example the may include a moisture meter, a pH tester, an alkalinity tester, a thermometer, and/or a light meter.

In step 804, data corresponding to the measured condition may be stored. For example, the data may be written to a memory circuit in the electronic tag. Step 804 may be performed substantially during the interrogation step 502. Alternatively, the interrogation step may include receiving an identification, and step 804 may include writing a value received from the treatment apparatus in step 802 to a database location corresponding to the identification.

Figure 9:
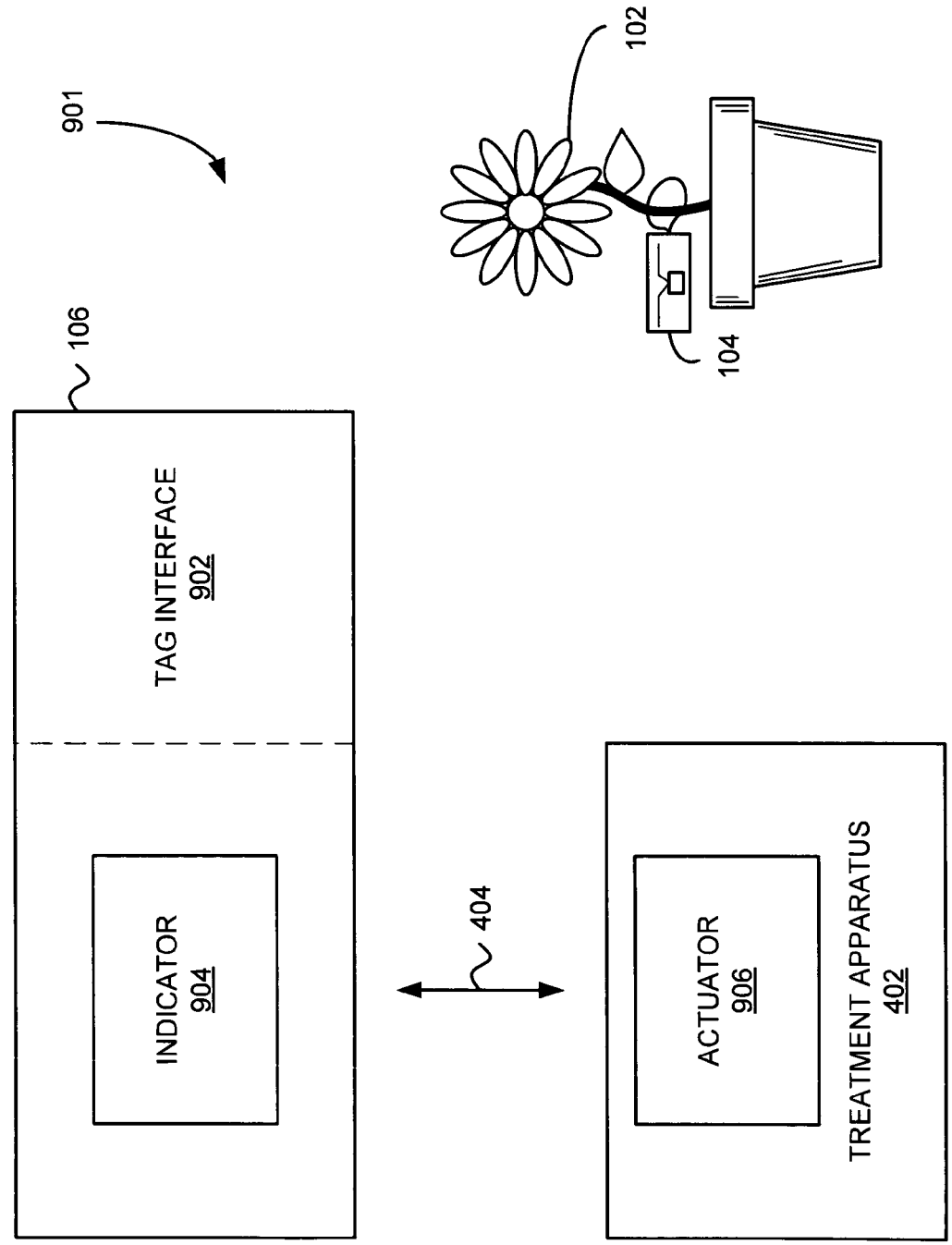
FIG. 9 is a diagram of a system including an electronic tag interrogator and an operatively coupled treatment apparatus, according to an embodiment.

FIG. 9 is a diagram of a system 901 including an electronic tag interrogator 106 and an operatively coupled treatment apparatus 402, according to an embodiment. The treatment apparatus 402 may include at least a portion configured for applying a treatment to at least one plant 102. For example, the first treatment apparatus may include one or more of a water source, a watering wand, a fertilizer source, a bulb planter, a lawn mower, a pruner, a trimmer, an aerator, a cultivator, a shovel, a spade, a harvester, a moisture meter, a pH tester, an alkalinity tester, a thermometer, or a light meter.

At least a portion of the electronic tag interrogator 106 may be operatively coupled to the treatment apparatus 402 by an operative coupling 404. At least a portion of the electronic tag interrogator 106 may include substantially the entire electronic tag interrogator 106. The electronic tag interrogator 106 includes a tag interface 902 such as a probe or antenna. The tag interface 902 may be disposed with other portions of the electronic tag interrogator 106. Alternatively, the tag interface 902 may be disposed separately from the portion of the treatment apparatus.

According to an embodiment, the electronic tag interrogator 106 may be configured to interrogate an electronic tag 104 corresponding to at least one plant 102 when the treatment apparatus 402 is brought into the vicinity of the at least one plant 102 and the electronic tag 104. For example, the electronic tag 106 may include a tag interface 902 configured to interface with the electronic tag 104. The tag interface 902 may include an apparatus that is mechanically and/or operatively coupled to the treatment apparatus 402. When the treatment apparatus 402 is brought into proximity with the at least one plant 102, the tag interface 902 of the electronic tag interrogator 106 may be thus positioned to interrogate a corresponding electronic tag 104.

According to an embodiment, the electronic tag interrogator 106 may be configured to transmit a signal indicative of a need for application of a treatment to a portion of the treatment apparatus 402 configured to receive the signal. For example, the treatment apparatus 402 may include an actuator 906 operatively coupled to receive the signal and responsively actuate the treatment apparatus 402.

According to an embodiment, the electronic tag interrogator 106 may include an indicator 904 configured to provide an indication of a need for treatment, such as to a user. The operative coupling 404 may then include manual actuation of the treatment apparatus 402 by the user.

The electronic tag interrogator 106 may include a microprocessor (not shown). The processor may be configured to execute computer instructions to compare data corresponding to the electronic tag 104 and the at least one plant 102 to a treatment condition, and set a treatment flag when a treatment is indicated. The data corresponding to the electronic tag 104 may, for example, include data received from the electronic tag. Additionally or alternatively, the data corresponding to the electronic tag 104 may include data from a database location corresponding to identification data received from the electronic tag 104.

According to an embodiment, the data corresponding to the electronic tag may include a sensed value of an environmental parameter that may be modified by the treatment, and the treatment condition may include a range of values of the environmental parameter. According to another example, the data corresponding to the electronic tag may includes a time or date corresponding to a previous application of the treatment, and the treatment condition may include an allowable elapsed duration between treatments.

According to an embodiment, setting a treatment flag includes presenting a visible or audible indicator of a need for treatment to a user via an indicator 904. For example, the indicator 904 may include a visible indicator such as an LED configured to illuminate, or a display configured to display an indicia indicative of a need for treatment or directions for treatment. Additionally or alternatively, the indicator 904 may be configured to provide audible prompt such as a recorded or synthesized voice, a beep, etc. or a vibration prompt. A prompted user may responsively operate the treatment apparatus 402, which may for example include manually actuating an actuator 906.

According to an embodiment, setting a treatment flag includes providing an enable signal to an actuator portion 906 of the treatment apparatus 402. The interrogator 106 may thus automatically control at least an aspect of treatment apparatus operation via the operative coupling 404. For example, the treatment apparatus 402 may include a fertilizing apparatus, with the interrogator 106 being configured to automatically actuate fertilizer application when it is determined that fertilizer application is indicated.

Figure 10:
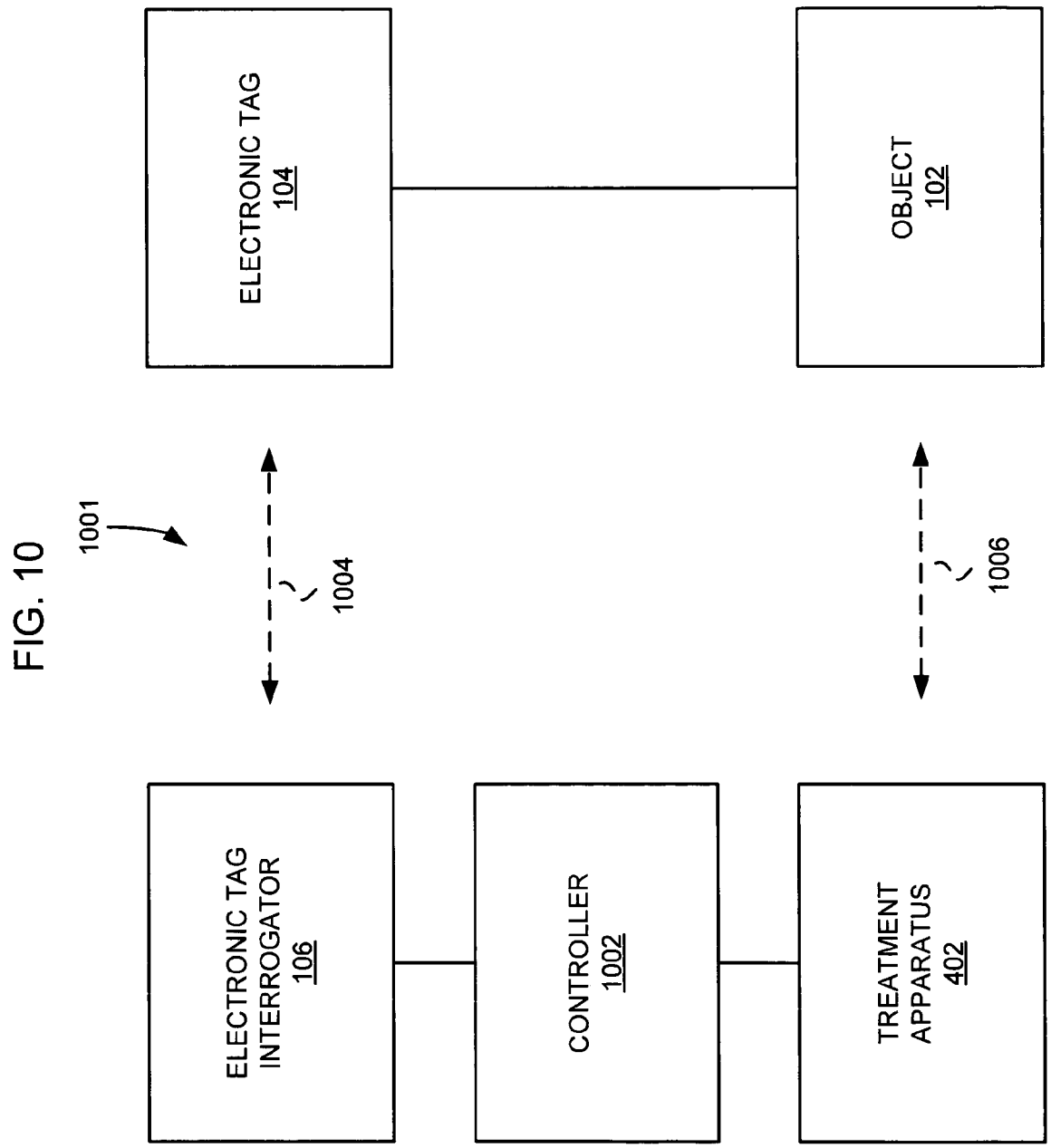
FIG. 10 is a block diagram of a system including an electronic tag interrogator and a controller for interfacing the electronic tag interrogator to a treatment apparatus, according to an embodiment.

FIG. 10 is a block diagram of a system 1001 including an electronic tag interrogator 106 and a controller 1002 for interfacing the electronic tag interrogator to a treatment apparatus 402, according to an embodiment. The electronic tag interrogator may interrogate an electronic tag 104 associated with one or more plants 102 via an interrogation data channel 1004. The electronic tag 104 may be physically coupled to the one or more plants, for example. The controller 1002 may receive data from the electronic tag interrogator 106 corresponding to data received from the electronic tag 104. The controller 1002 may control or initiate operation of the treatment apparatus 402 to apply a treatment to the one or more plants 102 via a treatment modality 1006. The treatment modality 1006 may include application of a physical treatment to the one or more plants 102. The treatment modality 1006 may include collection of information related to the one or more plants 102.

Alternatively or additionally, the treatment apparatus 402 may provide a signal to the controller 1002 when a treatment 1006 is provided to one or more plants 102. The controller 1002 may initiate or control operation of the electronic tag interrogator 106 to interrogate the electronic tag 104 via the interrogation data channel 1004. For example, the treatment apparatus 402 may include a lighting system for illuminating one or more plants 102, and a signal may be provided to the controller 1002 indicating providing the illumination. The controller 1002 may then initiate or control operation of the electronic tag interrogator 106 to write data to the electronic tag 104 indicative of the illumination.

While the embodiments illustrated by FIGS. 1, 9, and 10 may illustratively indicate physical associations, alternative physical associations may be provided. For example, the controller 1002 may be integrated with the electronic tag interrogator 106. Alternatively, the controller 1002 may be integrated with the treatment apparatus 402. Alternatively, the electronic tag interrogator 106, the controller 1002, and the treatment apparatus 402 may be integrated. Alternatively, the controller 1002 and/or the electronic tag interrogator 106 may be embodied as remote, for example networked, apparatuses. Alternatively, the functions of the electronic tag interrogator 106, controller 1002, and treatment apparatus 402 may be split into a larger number of physical apparatuses.

Figure 11:
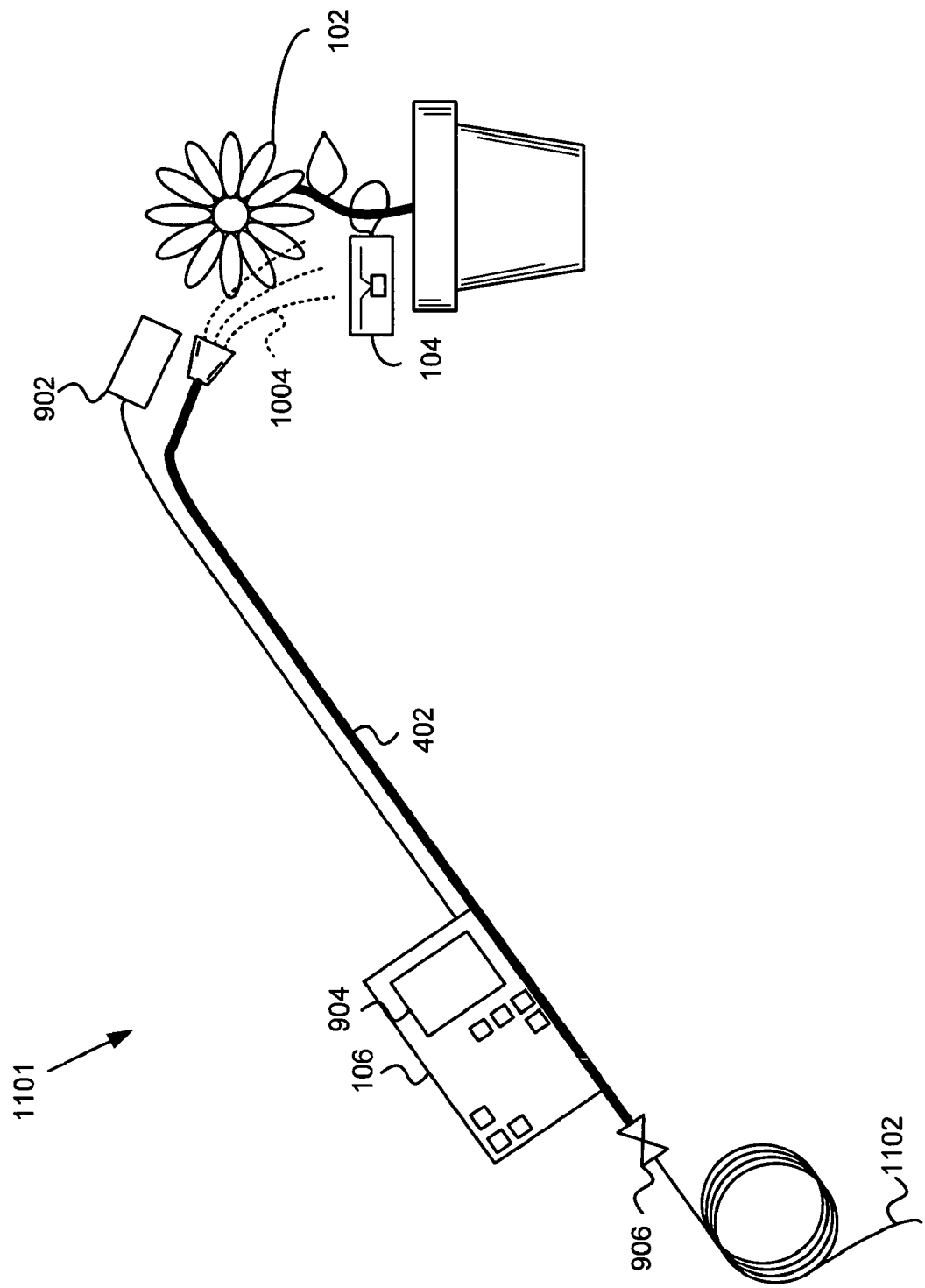
FIG. 11 is a diagram illustrating a system including a treatment apparatus and an operatively coupled electronic tag interrogator, according to an embodiment.

FIG. 11 is a diagram illustrating system 1101 including a treatment apparatus 402 with an operatively coupled electronic tag interrogator 106 configured to apply treatments 1006 to at least one plant 102, according to an embodiment. In the illustrative embodiment 1101, the treatment apparatus 402 includes a watering wand configured to selectively apply water 1006 from a water source 1102 to plants 102.

According to an embodiment, the electronic tag interrogator 106 may include a radio frequency tag interrogator and/or a touch memory interrogator. The electronic tag interrogator 106 may include a remote electronic tag interface 902 such as an antenna or touch memory probe disposed near the watering system 402 tip. When the watering system tip is brought near or into contact with the at least one plant 102, the probe tip 902 may be brought into contact with a touch memory device 104 or the antenna 902 may be brought into an interrogation range of the radio frequency tag 104. In this way, the electronic tag interrogator 106 may interrogate an electronic tag 104 associated with the at least one plant 102. As described above, various transactions including a range of logical relationships between the treatment apparatus 402, the electronic tag interrogator 106, the electronic tag 104, and the at least one plant may be executed.

According to an embodiment, the electronic tag interrogator 106 may interrogate at least one electronic tag 104 associated with at least one plant 102 and receive a value corresponding to a treatment. The electronic tag interrogator 106 may include a user interface 904 operable to provide an indication corresponding to the value, such as an indication to apply water or not apply water. A user (not shown) may respond to the indication by controlling the treatment apparatus 402, for instance by actuating a valve 906 to apply water 1004 or not apply water. The user may indicate the treatment by providing an input to the electronic tag interrogator 106, such as by pushing a button, and the electronic tag interrogator 106 may responsively write data to the electronic tag 104 indicative of the applied treatment. Optionally, the valve 906 may include an interface to the electronic tag interrogator 106, and the electronic tag interrogator 106 may automatically write data to the electronic tag 104 indicative of the applied treatment. Optionally, the indicator 904 may provide an indication of a successful interrogation or unsuccessful interrogation, such as successfully writing the data to the electronic tag 104 or not being successful in writing the data to the electronic tag 104.

According to an embodiment, the electronic tag interrogator 106 may include a control coupling (not shown) to the actuator 906. Responsive to receiving a value from the electronic tag 104 corresponding to an indication to apply water, the electronic tag interrogator 106 may initiate or drive actuation of the valve 906 to provide watering 1004.

The foregoing specific exemplary processes and/or devices and/or technologies are representative of more general processes and/or devices and/or technologies taught elsewhere herein, such as in the claims filed herewith and/or elsewhere in the present application.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). The subject matter described herein may be implemented in an analog or digital fashion or some combination thereof.

The reader will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, the reader may translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

In some instances, one or more components may be referred to herein as "configured to." Those skilled in the art will recognize that "configured to" can generally encompass active-state components and/or inactive-state components and/or standby-state components, etc. unless context requires otherwise.

While particular aspects of the present subject matter described herein have been shown and described, it will be apparent that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.; and may include systems having more than one of any of A, B or C, for example, $A_1$, $A_2$, and B, or A, $B_1$, $B_2$, $B_3$, and C.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A method for tracking treatments for at least one plant, comprising:
   interrogating an electronic tag associated with at least one plant using an electronic tag interrogator operatively coupled to a treatment apparatus; and
   applying a treatment to the at least one plant.

2. The method of claim 1, further comprising:
   storing in memory a record of the applied treatment.

3. The method of claim 2, wherein storing in memory includes writing to a writable memory circuit in the electronic tag.

4. The method of claim 2, wherein interrogating the electronic tag includes reading an identity code from the electronic tag; and
   wherein storing in memory includes writing to an external database location corresponding to the identity code.

5. The method of claim 1, further comprising:
   reading a record of past treatments applied to the at least one plant.

6. The method of claim 5, wherein the record of past treatments are read from a memory circuit in the electronic tag.

7. The method of claim 5, wherein interrogating the electronic tag includes reading an identity code from the electronic tag, and
   wherein the record of past treatments are read from an external database location corresponding to the identity code.

8. The method of claim 5, further comprising:
   determining if the treatment is needed; and
   wherein applying the treatment is performed conditional to the determination.

9. The method of claim 1, wherein the electronic tag interrogator is physically coupled to the treatment apparatus.

10. The method of claim 1, further comprising:
    controlling the treatment apparatus responsive to a data value corresponding to the interrogation.

11. The method of claim 10, wherein the data value includes an elapsed time since a previously recorded treatment time.

12. The method of claim 1, wherein the treatment includes a measurement made by a treatment apparatus.

13. The method of claim 12, wherein the treatment is applied by at least one treatment apparatus including a moisture meter, a pH tester, an alkalinity tester, a thermometer, or a light meter.

14. The method of claim 12 wherein interrogating the electronic tag includes writing to the electronic tag a value received from the treatment apparatus.

15. The method of claim 12, wherein interrogating the electronic tag includes reading an identification; and further comprising;
writing a value received from the treatment apparatus to a database location corresponding to the identification.

16. The method of claim 1, wherein the treatment includes a physical modification of the at least one plant or a modification of the environment of the at least one plant.

17. The method of claim 16, wherein the treatment is applied by at least one of a water source, a watering wand, a fertilizer source, a bulb planter, a lawn mower, a pruner, a trimmer, an aerator, a cultivator, a shovel, a spade, or a harvester.

18. The method of claim 1, further comprising:
reading from the electronic tag a value corresponding to an environment of the at least one plant; and
wherein the application of the treatment is made responsive to the value.

19. The method of claim 18, further comprising:
automatically controlling a treatment apparatus responsive to the value corresponding to the environment.

20. The method of claim 1, wherein the application of the treatment is operatively coupled to the interrogation of the electronic tag.

21. The method of claim 20, further comprising:
providing an indication of a need for treatment to a gardener, farmer, nurseryperson, harvester, planter, propagator, maintenance worker, or administrator responsive to data received responsive to the interrogation of the electronic tag.

22. The method of claim 20, further comprising:
automatically controlling a treatment apparatus responsive to data received responsive to the interrogation of the electronic tag.

23. The method of claim 1, wherein interrogating the electronic tag includes at least one of performing radio frequency interrogation, performing touch memory interrogation, performing proximity card interrogation, performing photonic tag interrogation, or performing smart card interrogation.

24. The method of claim 1, wherein the at least one plant includes at least one of at least one seed, cutting, rhizome, bulb, corm, tuber, annual, biennial, cut flower, perennial, grass, creeper, climber, vine, fern, shrub, bush, or tree.

25. The method of claim 1, wherein applying the treatment includes at least one of physically modifying the at least one plant, pruning the at least one plant, trimming the at least one plant, mowing the at least one plant, harvesting the at least one plant, modifying the environment of the at least one plant, watering the at least one plant, fertilizing the at least one plant, modifying the soil pH in the environment of the at least one plant, cultivating the soil in the environment of the at least one plant, aerating the soil in the environment of the at least one plant, planting the at least one plant, transplanting the at least one plant, heating the soil near the at least one plant, heating the air in the vicinity of the at least one plant, illuminating the at least one plant, measuring the environment of the at least one plant, measuring moisture in the vicinity of the at least one plant, measuring pH in the environment of the at least one plant, measuring alkalinity in the environment of the at least one plant, measuring the temperature in the environment of the at least one plant, or measuring illumination in the vicinity of the at least one plant.

26. A system for applying a treatment to at least one plant, comprising:
a treatment apparatus configured for applying a treatment to at least one plant; and
at least a portion of an electronic tag interrogator operatively coupled to the treatment apparatus.

27. The system for applying a treatment to at least one plant of claim 26, wherein the treatment apparatus includes at least one of:
a water source, a watering wand, a fertilizer source, a bulb planter, a lawn mower, a pruner, a trimmer, an aerator, a cultivator, a shovel, a spade, a harvester, a moisture meter, a pH tester, an alkalinity tester, a thermometer, or a light meter.

28. The system for applying a treatment to at least one plant of claim 26, wherein the electronic tag interrogator includes a radio frequency interrogator; a touch memory interrogator, a proximity card interrogator, a photonic tag interrogator, or a smart card interrogator.

29. The system for applying a treatment to at least one plant of claim 26, wherein the treatment apparatus is configured to apply a treatment to at least one plant including at least one seed, a cutting, a rhizome, a bulb, a corm, a tuber, an annual, a biennial, a cut flower, a perennial, a grass, a creeper, a climber, a vine, a fern, a shrub, a bush, or a tree.

30. The system for applying a treatment to at least one plant of claim 26, wherein the electronic tag interrogator is configured to interrogate an electronic tag corresponding to at least one plant when the first apparatus portion is brought into the vicinity of the at least one plant and the electronic tag.

31. The system for applying a treatment to at least one plant of claim 26, wherein the electronic tag interrogator is configured to transmit to the treatment apparatus a signal indicative of a need for application of the treatment; and
wherein the treatment apparatus is configured to receive the signal from the electronic tag interrogator.

32. The system for applying a treatment to at least one plant of claim 31, wherein the treatment apparatus further includes a treatment actuator operatively coupled to receive the signal and responsively actuate.

33. The system for applying a treatment to at least one plant of claim 26, wherein the electronic tag interrogator includes a processor configured to compare data corresponding to the electronic tag to a treatment condition, and set a treatment flag when the treatment is indicated.

34. The system for applying a treatment to at least one plant of claim 33, wherein setting the treatment flag includes presenting a visible or audible treatment indicator to a user.

35. The system for applying a treatment to at least one plant of claim 33, wherein the treatment apparatus includes a treatment actuator; and
wherein setting the treatment flag includes providing an enable signal to the treatment actuator.

36. The system for applying a treatment to at least one plant of claim 33, wherein the data corresponding to the electronic tag includes a sensed value of an environmental parameter that is modified by the treatment.

37. The system for applying a treatment to at least one plant of claim 33, wherein the data corresponding to the electronic tag includes a time or date corresponding to a previous application of the treatment; and
wherein the treatment condition includes an allowable elapsed duration between treatments.

38. The system for applying a treatment to at least one plant of claim 26, wherein the at least a portion of the electronic tag interrogator includes substantially the entire electronic tag interrogator.

39. The system for applying a treatment to at least one plant of claim 26, wherein the at least a portion of the electronic tag interrogator includes a probe or antenna; and wherein a second portion of the electronic tag interrogator is disposed separately from the portion of the treatment apparatus.

40. A system for determining the need for the application of at least one treatment to at least one plant, comprising:

a treatment apparatus configured to apply at least one treatment to at least one plant; and an electronic tag interrogator operatively coupled to the treatment apparatus and configured to read a value from at least one electronic tag associated with the at least one plant, the value corresponding to the receipt of previously-applied treatments.

41. The system of claim 40, wherein the electronic tag interrogator is further configured to perform computer processing to determine if the receipt of previously-applied treatments corresponds to a need for a new treatment.

42. The system of claim 40, further comprising:

a computing resource operatively coupled to the electronic tag interrogator and configured to compute a need for a new treatment.

43. A system for automatically applying at least one treatment to at least one plant, comprising:

a treatment apparatus configured to apply at least one treatment to at least one plant;

an electronic tag interrogator configured to interrogate at least one electronic tag associated with the at least one plant; and a controller operatively coupled to the interrogator and the treatment apparatus and configured to actuate the treatment apparatus responsive to a data value received through the electronic tag interrogator.

44. A system for selectively applying at least one treatment to at least one plant, comprising:

an electronic tag interrogator operable to interrogate at least one electronic tag associated with at least one plant and receive a value corresponding to a treatment;

a user interface operatively coupled to the interrogator and operable to provide an indication corresponding to the value; and a treatment apparatus operatively coupled to the electronic tag interrogator and configured to selectively apply the at least one treatment responsive to a user actuation.

45. The system of claim 44, wherein the treatment apparatus comprises a watering apparatus.

46. A system operable to inform a user of a need for plant care, comprising:

an electronic tag interrogator configured to interrogate an electronic tag associated with at least one plant and receive a value corresponding to a treatment; and a controller configured to initiate communication with a user when the value corresponds to a need for treatment.

47. The system of claim 46, further comprising:

a user interface operatively coupled to the controller and configured to provide communication to the user indicating the need for treatment.

48. The system of claim 47, wherein the user interface includes at least one of a visible indicator, an audible indicator, or a vibratory indicator.

49. The system of claim 47, wherein the user interface includes at least one of an LED, a video display, a voice synthesizer, a beeper, or a vibrator.

50. A method for tracking treatments for at least one plant, comprising:

applying a treatment to at least one plant;

writing data corresponding to the application of the treatment to an electronic tag associated with the at least one plant; and providing indication to a user corresponding to a status of data written to the electronic tag.

51. The method of claim 50, further comprising:

receiving a treatment application signal from a treatment actuator; and wherein the step of writing data corresponding to the application of the treatment is performed responsive to receiving the treatment application signal.

52. The method of claim 50, wherein the indication corresponds to successful writing of data to the electronic tag.

53. A method for tracking treatments for at least one plant, comprising:

interrogating an electronic tag associated with at least one plant; and applying a treatment to the at least one plant, wherein the treatment includes a measurement made by a treatment apparatus.

54. The method of claim 53, wherein the treatment is applied by at least one treatment apparatus including a moisture meter, a pH tester, an alkalinity tester, a thermometer, or a light meter.

55. The method of claim 53, wherein interrogating the electronic tag includes writing to the electronic tag a value received from the treatment apparatus.

56. The method of claim 53, wherein interrogating the electronic tag includes reading an identification; and further comprising;

writing a value received from the treatment apparatus to a database location corresponding to the identification.

57. A method for tracking treatments for at least one plant, comprising:

interrogating an electronic tag associated with at least one plant;

reading from the electronic tag a value corresponding to an environment of the at least one plant; and applying a treatment to the at least one plant responsive to the value.

58. The method of claim 57, further comprising:

automatically controlling a treatment apparatus responsive to the value corresponding to the environment.

59. A method for tracking treatments for at least one plant, comprising:

interrogating an electronic tag associated with at least one plant; and applying a treatment to the at least one plant, wherein the application of the treatment is operatively coupled to the interrogation of the electronic tag.

60. The method of claim 59, further comprising:

providing an indication of a need for treatment to a gardener, farmer, nurseryperson, harvester, planter, propagator, maintenance worker, or administrator responsive to data received responsive to the interrogation of the electronic tag.

61. The method of claim 59, further comprising:

automatically controlling a treatment apparatus responsive to data received responsive to the interrogation of the electronic tag.

62. A method for tracking treatments for at least one plant, comprising:
- receiving a treatment application signal from a treatment actuator;
- applying a treatment to at least one plant; and
- responsive to receiving the treatment application signal, writing data corresponding to the application of the treatment to an electronic tag associated with the at least one plant.

63. The method of claim 62, further comprising:
- providing indication to a user corresponding to a status of data written to the electronic tag.

64. The method of claim 63, wherein the indication corresponds to successful writing of data to the electronic tag.

* * * * *